United States Patent
Chen

(10) Patent No.: US 7,385,313 B2
(45) Date of Patent: Jun. 10, 2008

(54) CONTROLLER FOR ON-OFF SWITCHING OF POWER SUPPLIES

(75) Inventor: Tao-Gen Chen, Guangdong (CN)

(73) Assignees: Hong Fu Jin Precision Industry (Shen Zhen) Co., Ltd., Bao'an District, Shenzhen, Guangdong Province (CN); Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 291 days.

(21) Appl. No.: 11/162,289

(22) Filed: Sep. 6, 2005

(65) Prior Publication Data
US 2006/0153361 A1    Jul. 13, 2006

(30) Foreign Application Priority Data
Jan. 10, 2005    (CN)    .................... 2005 1 0032794

(51) Int. Cl.
*H01H 3/26* (2006.01)
(52) U.S. Cl. .................................................. 307/140
(58) Field of Classification Search ................ 307/140
See application file for complete search history.

(56) References Cited

U.S. PATENT DOCUMENTS 4,622,647 A * 11/1986 Sagnard et al. ............. 702/118
7,069,109 B2 * 6/2006 Huffington ................ 700/211

FOREIGN PATENT DOCUMENTS

CN          1487302 A        4/2004

OTHER PUBLICATIONS

IBM Technical Disclosure Bulletin, Sep. 1, 1980, US, vol. 23, Issue 4, p. No. 1377-1380.*
Derwent-Acc-No. 1996-177002, Week 199618, Nippon Steel Corp.,Aug. 12, 1994.*

* cited by examiner

*Primary Examiner*—Robert L. DeBeradinis
(74) *Attorney, Agent, or Firm*—Winston Hsu

(57) ABSTRACT

A controller for on-off switching of power supplies includes: a microprocessor, to which a memory and a power supply interface and reset circuit are connected; a communication interface converting voltage signals between the microprocessor and an RS232 interface; an on-off control circuit which is connected to the microprocessor, comprising at least one relay for controlling on-off switching of the power supplies, and an amplifying circuit for driving said relay; a feedback circuit feeding on-off states to the microprocessor; and a voltage converter providing steady voltage to the power supply interface and reset circuit, the communication interface, and the on-off control circuit. The on-off control circuit is capable of controlling a large number of power supplies, and the communication interface connects the controller to a remote console.

18 Claims, 5 Drawing Sheets

CONTROLLER FOR ON-OFF SWITCHING OF POWER SUPPLIES

FIELD OF THE INVENTION

The present invention relates to an electrical performance test device for power supplies, and particularly to a controller for on-off switching of power supplies when testing a plurality of pieces of electrical equipment.

DESCRIPTION OF RELATED ART

At the stage of researching and developing electrical equipment such as PCs and servers, if electrical circuits of the electrical equipment are improperly designed, bridge piles, rectifier diodes, or integrated circuits near large capacitors may be damaged at the moment the power is switched on. Thus electrical equipment usually needs sequential on-off switching of power in order to test the stability of the components of the electrical equipment. Manual operation of on-off switching is unduly labor-intensive, and is subject to unreliable results because of human error.

Currently, hybrid digital/analog circuits are adopted in the on-off switching of a power supply. Chinese patent application No. 03140174.0 provides an on-off test apparatus for electrical equipment. The test apparatus comprises a microprocessor, a power supply circuit for the microprocessor, an on-off output circuit connected to the microprocessor, a detecting circuit of a termination of the test, and a memory. The test apparatus can save the total number of times of switching on and switching off, save the total accumulated time of switching on and switching off, and save other test parameters when the test apparatus is shut down. The test apparatus can save test parameters when the electrical equipment under test becomes disabled. However, one such test apparatus can test only one piece of electrical equipment. The test apparatus cannot control more than one piece of electrical equipment. Furthermore, in some applications, the electrical equipment may be located far away from the console of the test apparatus. But the test apparatus can only control electrical equipment located close to the console, because the test apparatus lacks remote monitoring.

What is needed, therefore, is a controller for on-off switching of power supplies which is able to provide remote monitoring and control of more than one piece of electrical equipment.

SUMMARY OF INVENTION

A controller for on-off switching of power supplies is provided, for controlling more than one piece of electrical equipment and for remote monitoring. In a preferred embodiment, the controller for on-off switching of power supplies includes: a microprocessor, to which a memory and a power supply interface and reset circuit are connected; a communication interface converting voltage signals between the microprocessor and an RS232 interface; an on-off control circuit which is connected to the microprocessor, comprising at least one relay for controlling on-off switching of the power supplies, and an amplifying circuit for driving said relay; a feedback circuit feeding on-off states to the microprocessor; and a voltage converter providing steady voltage to the power supply interface and reset circuit, the communication interface, and the on-off control circuit. The on-off control circuit is capable of controlling a large number of power supplies, and the communication interface connects the controller to a remote console.

Other advantages and novel features will become more apparent from the following detailed description of preferred embodiments when taken in conjunction with the accompanying drawings, in which:

DETAILED DESCRIPTION

Figure 1:
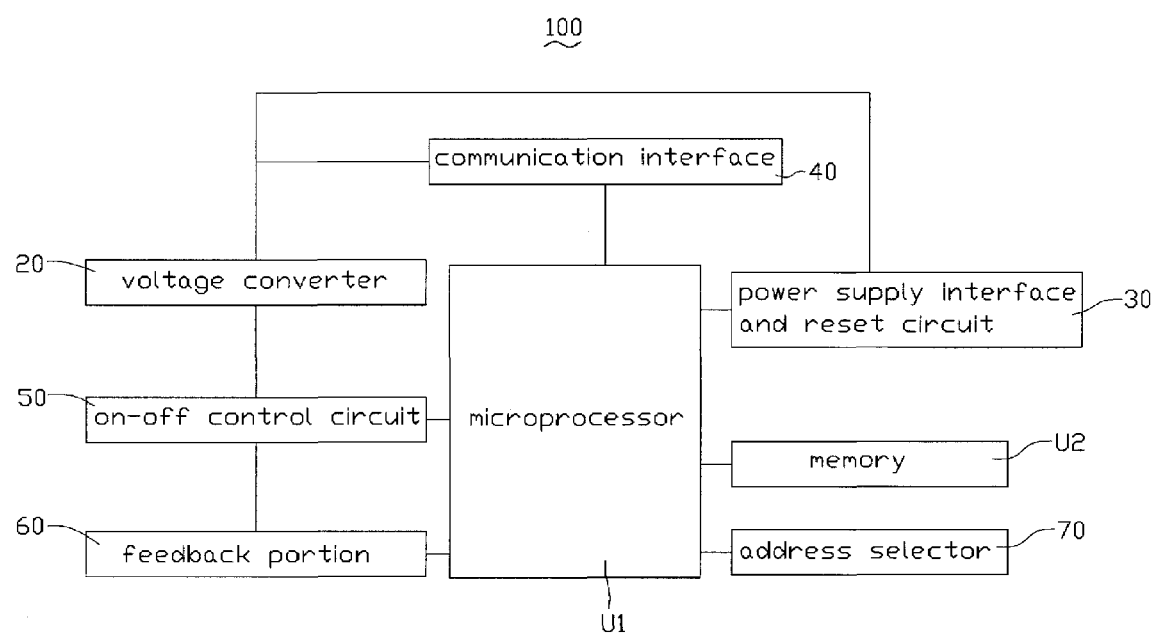
FIG. 1 is a block diagram of architecture of a controller in accordance with a preferred embodiment of the present invention.

FIG. 1 shows a controller 100 for on-off switching of power supplies in accordance with a preferred embodiment of the present invention. The controller 100 includes a microprocessor U1, a memory U2, a voltage converter 20, a power supply interface and reset circuit 30, a communication interface 40, an on-off control circuit 50, a feedback portion 60, and an address selector 70.

The memory U2 is connected to the microprocessor U1, for storing the data processed by the microprocessor U1. The power supply interface and reset circuit 30 is connected to the microprocessor U1, for providing voltage signals and reset signals to the microprocessor U1. The communication interface 40 is connected to the microprocessor U1, for converting voltage signals between the microprocessor U1 and an outside communication interface. The on-off control circuit 50 is connected to the microprocessor U1 for controlling on-off switching of the power supplies. The feedback portion 60 is connected between the microprocessor U1 and the on-off control circuit 50, for feeding on-off states of the power supplies to the microprocessor U1. The voltage converter 20 provides steady voltage to the power supply interface and reset circuit 30, the communication interface 40, and the on-off control circuit 50. The address selector 70 is connected to the microprocessor U1, for setting an address of the controller 100.

Figure 2:
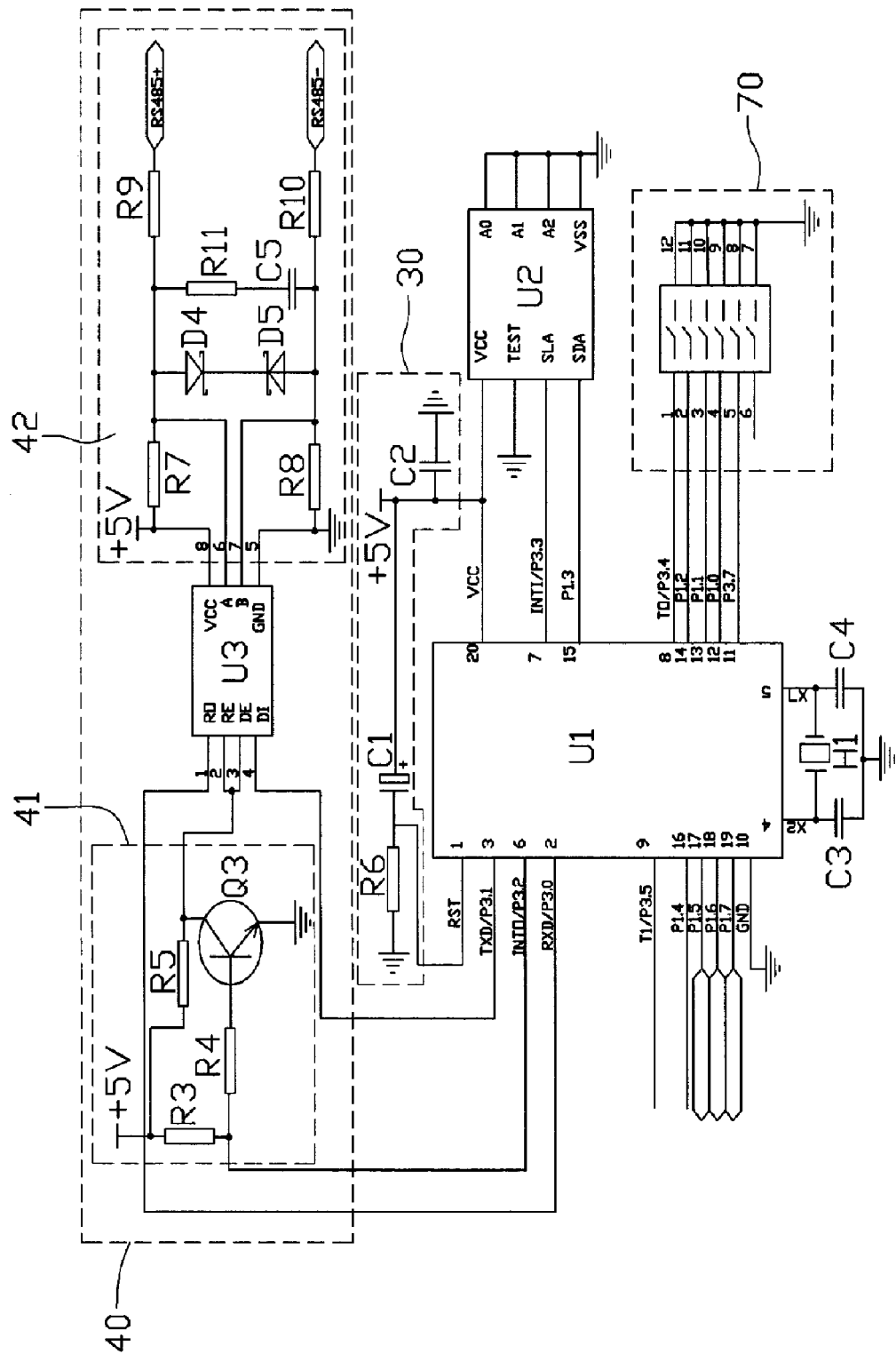
FIG. 2 is a circuit diagram of an microprocessor, a memory, a power supply interface and reset circuit, a communication interface, and an address selector, all of the controller of FIG. 1.

As shown in FIG. 2, the microprocessor U1, which is the control centre of the controller 100, can be, for example, Model 89C2051 available from ATMEL Corporation. A circuit including a crystal oscillator H1 and capacitors C3, C4 provides a working frequency for the microprocessor U1. The microprocessor U1 is compatible with MCS51 instructions, and contains a 2 KB flash programmable memory, twenty pins, fifteen controllable I/O pins, and five interrupt sources.

Figure 3:
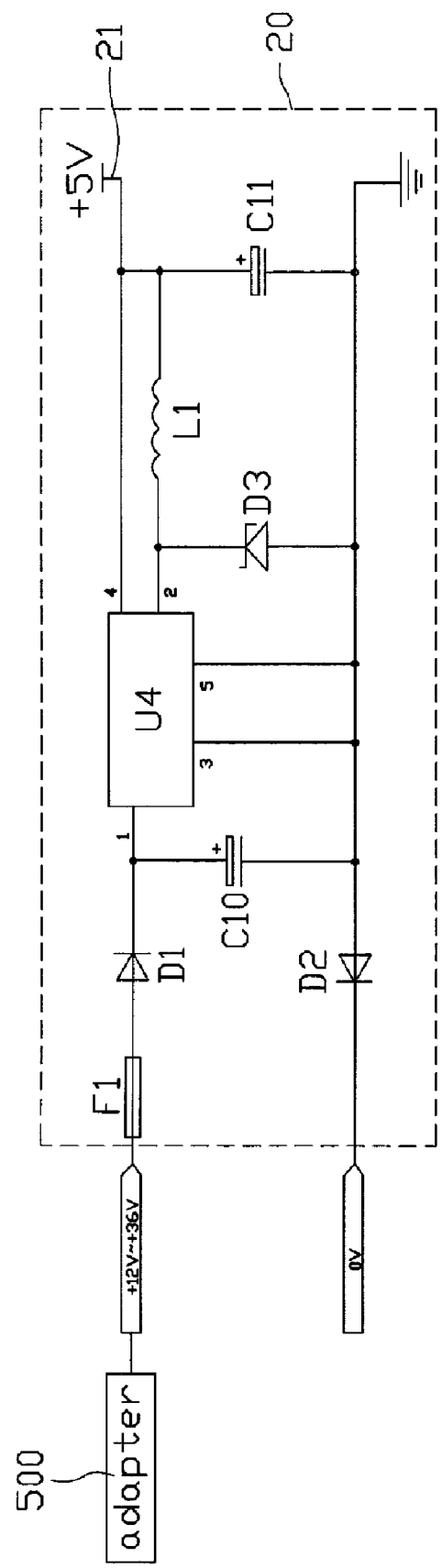
FIG. 3 is a circuit diagram of a voltage converter of the controller of FIG. 1.

As shown in FIG. 3, the voltage converter 20 includes a fuse F1, a voltage regulator chip U4, diodes D1, D2, a Zener diode D3, capacitors C10, C11, and an inductance L1. The voltage converter 20 converts a 12-36 volt voltage from an adapter 500 to a 5 volt voltage, and then provides the 5 volt voltage as a voltage source 21 to the controller 100.

The memory U2 (Model AT24C02, for example) can store 8 KB of data, which is permanently stored even after power off. The memory U2 is used to store the data processed by the microprocessor U1. Pin Vcc of the memory U2 connects to the 5 volt voltage source 21, and Pins SLA, SDA of the memory U2 respectively connect to Pin7 and Pin15 of the microprocessor U1.

The power supply interface and reset circuit 30, which interfaces to the 5 volt voltage source 21, includes a resistor R6, and capacitors C1, C2. The 5 volt voltage source 21 connects to a power end (Pin20) of the microprocessor U1. One end of the capacitor C2 connects to a node between the Pin20 and the 5 volt voltage source 21, and the other end of the capacitor C2 is connected to ground. A node between the capacitor C1 and the resistor R6 connects to a reset end (Pin1) of the power supply interface and reset circuit 30, for providing reset signals to the microprocessor U1 to assure its internal work is prepared while power is on.

The communication interface 40 includes a signal amplifying circuit 41, a communication chip U3 (Model 3082, for example), and a voltage regulation circuit 42 connected in series. The signal amplifying circuit 41 includes resistors R3, R4, R5 and a transistor Q3. The voltage regulation circuit 42 includes resistors R7, R8, R9, R10, R11, a capacitor C5, and Zener diodes D4, D5. Pin RO and Pin DI of the communication chip U3 respectively connect to a serial input (Pin2) and a serial output (Pin3) of the microprocessor U1. An input of the signal amplifying circuit 41 connects to an interrupt request input (Pin6) of the microprocessor U1, while an output of the signal amplifying circuit 41 connects to Pin RE and Pin DE of the communication chip U3. The voltage regulation circuit 42 connects to Pins Vcc, GND, A, B of the communication chip U3. The communication interface 40 converts a TTL level signal output from the microprocessor U1 to a steady RS485 level signal, and likewise converts an RS485 level signal received from outside to a TTL level signal for the microprocessor U1. The RS485 level signal can be transmitted over long distances up to one kilometer. Alternatively, a controller without the communication interface 40 may be configured. However, such controller cannot provide remote monitoring and control.

Figure 4:
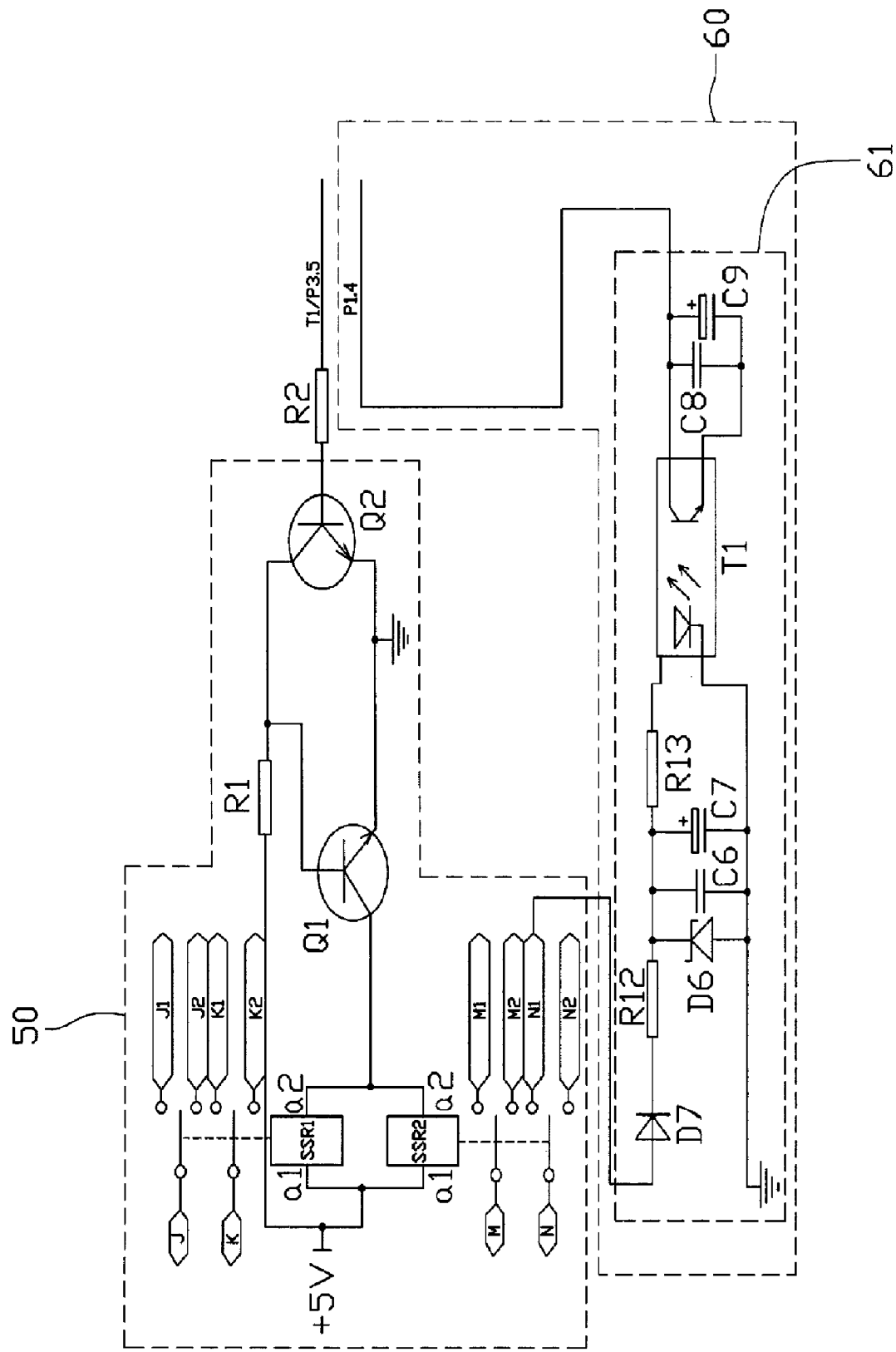
FIG. 4 is a circuit diagram of an on-off control circuit and one of feedback circuits of a feedback portion of the controller of FIG. 1.

As shown in FIG. 4, the on-off control circuit 50 includes two transistors Q1, Q2, and two solid state relays SSR1, SSR2. The transistors Q1, Q2 form a two-level amplifying circuit. A base of the transistor Q2 connects to Pin9 of the microprocessor U1 via a resistor R2. Emitters of the transistors Q1 and Q2 are connected to ground. A base of the transistor Q1 and a collector of the transistor Q2 connect to a first input al of the relays SSR1 and SSR2 via a resistor R1, while a collector of the transistor Q1 connects to a second input a2 of the relays SSR1 and SSR2. The first input al also connects to the 5 volt voltage source 21. An output of the relay SSR1 connects to a first valve J and a second valve K, while an output of the relay SSR2 connects to a third valve M and a fourth valve N. Each valve J, K, M, N has two states: switched on and switched off. For example, first valve on is J1, first valve off is J2, second valve on is K1, second valve off is K2, third valve on is M1, third valve off is M2, fourth valve on is N1, and fourth valve off is N2.

The feedback portion 60 includes four groups of feedback circuits with the same components. As an example, an input of a feedback circuit 61 is connected between fourth valve off N2 and Pin16 of the microprocessor U1. The feedback circuit 61 includes a diode D7 that rectifies a voltage from the on-off control circuit, a resistor R12 that drops the voltage, a Zener diode D6 that regulates the voltage, capacitors C6, C7 and a resistor R13 constituting a filter network, an opto-electrical coupling apparatus T1 for electric isolation, and capacitors C8, C9 that filter again. The other three groups of feedback circuits (not shown) are respectively between third valve off M2 and Pin17 of the microprocessor U1, between second valve off K2 and Pin18 of the microprocessor U1, and between first valve off J2 and Pin19 of the microprocessor U1. Each of the other three groups of feedback circuits is the same as the feedback circuit 61.

Figure 5:
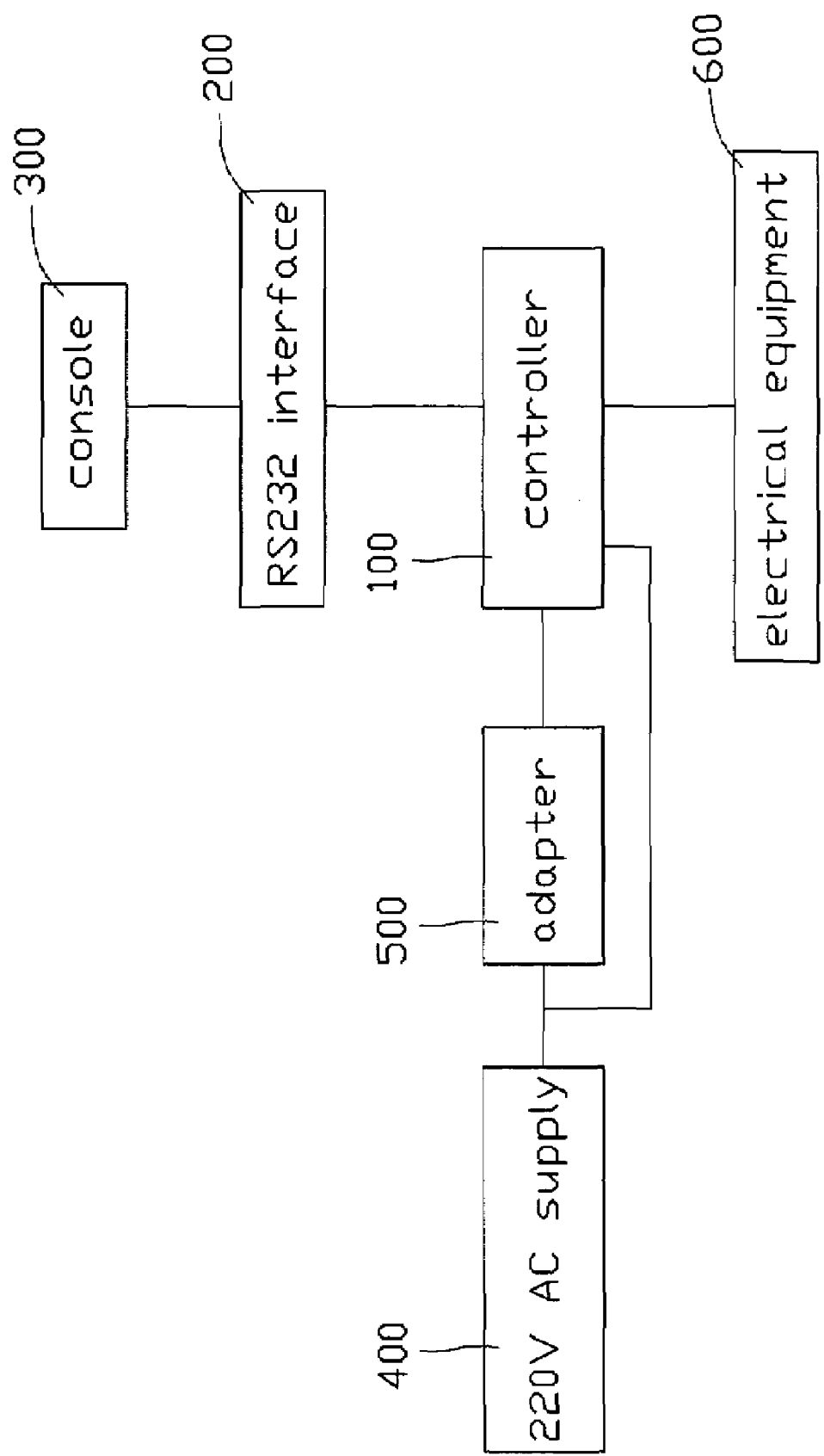
FIG. 5 is a block diagram of architecture of an application environment of the controller of FIG. 1.

As shown in FIG. 5, in use of the controller 100 in an exemplary application, the communication interface 40 connects to a line parallel tandem (LPT) of a console 300 via the outside communication interface such as an RS232 interface 200. The RS232 interface converts the RS485 level signal to an RS232 level signal that adapts to the console 300. A 220 volt AC supply 400 outputs a 220 volt voltage to the adapter 500, and the adapter 500 converts the 220 volt voltage to the 12-36 volt voltage. The voltage converter 20 converts the 12-36 volt voltage to the 5 volt voltage, and then provides the 5 volt voltage to the power supply interface and reset circuit 30, the communication interface 40, and the on-off control circuit 50. One or more pieces of electrical equipment 600 are connected to the 220 volt AC supply 400 via the relays SSR1, SSR2 of the controller 100. The number of pieces of electrical equipment 600 can be up to and including four pieces. After power on, the controller 100 begins to work. Some parameters such as the time on or off are firstly set up via a setting interface of a console 300. The parameters are stored in the console 300. Then the power is turned off and turned back on again. The microprocessor U1 controls the working states of the relays SSR1, SSR2 according to the parameters stored in the console 300. When the relays SSR1, SSR2 are switched on, the electrical equipment 600 is switched on with the 220 volt AC supply 400 and runs. When the relays SSR1, SSR2 are switched off, the electrical equipment 600 is switched off with the 220 volt AC supply 400 and does not operate. The on-off states and the current of each of the pieces of electrical equipment 600 feed back to the microprocessor U1. The microprocessor U1 stops working when the number of times of on-off switching reaches a predetermined threshold number.

The controller 100 has expansibility to control a large number of pieces of electrical equipment. FIG. 2 shows a jumper as the address selector 70 in accordance with an exemplary embodiment of the present invention. The address selector 70 can alternatively be another kind of manual switch. Pins 8, 11, 12, 13, 14 of the microprocessor U1 respectively connect to each pin of one side of the jumper. Each pin of the other side of the jumper is connected to ground. An address of the controller is set by connecting the pins of one side of the jumper with the pins of the other side of the jumper. An interrupt request input terminal (Pin6) of the microprocessor U1 that outputs an address signal connects to an outside communication interface, for example an RS232 interface 200, via the communication interface 40. Therefore the number of controllers 100 connected to the RS232 interface 200 can reach $2^5=32$. For each RS232 interface 200, the total number of pieces of electrical equipment can be as high as 128, because each controller 100 can drive four pieces of electrical equipment. As will be understood by artisans, the total number of pieces of electrical equipment is not limited to the above-described examples. The total number is related to the driving ability of the controller for on-off switching of power supplies, and to the number of I/O pins for address selecting of the microprocessor U1.

The controller for on-off switching of power supplies can be applied to, for example, the testing of computer power supplies, communication power supplies, performance of electrical equipment switching on-off functionality, and remote monitoring of electrical equipment.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A controller for on-off switching of one or more power supplies, comprising:
    a microprocessor;
    a power supply interface and reset circuit connected to the microprocessor;
    a communication interface connected to the microprocessor, for converting voltage signals between the microprocessor and an outside communication interface;
    an on-off control circuit which is connected to the microprocessor, comprising a first transistor, a second transistor, a first relay, and a second relay, the first and second transistors forming a two-level amplifying circuit, the base of the second transistor connected to the microprocessor via a first resistor, the emitters of the first and second transistors connected to ground, the base of the first transistor and the collector of the second transistor connected to a first input of the first and second relays via a second resistor, the collector of the first transistor connected to a second input of the first and second relays, the first input of the first and second relays also connected to a voltage source, an output of the first relay connected to a first valve and a second valve, while an output of the second relay connected to a third valve and a fourth valve, one or more pieces of electrical equipment connected to an AC supply via the first and second relays;
    a feedback portion connected between the microprocessor and the first, second, third, and forth valves of the on-off control circuit, for feeding on-off states of the power supplies to the microprocessor;
    a memory connected to the microprocessor, for storing the data processed by the microprocessor; and
    a voltage converter for providing steady voltage to the power supply interface and reset circuit, the communication interface, and the on-off control circuit.

2. The controller as claimed in claim 1, further comprising an address selector connected to the microprocessor, for setting an address of said controller.

3. The controller as claimed in claim 2, wherein said address selector is a jumper.

4. The controller as claimed in claim 1, further comprises a crystal oscillator for providing a working frequency for the microprocessor.

5. The controller as claimed in claim 1, wherein said communication interface comprises a signal amplifying circuit, a communication chip, and a voltage regulation circuit connected in series.

6. The controller as claimed in claim 1, wherein said amplifying circuit comprises a plurality of transistors.

7. The controller as claimed in claim 1, wherein said feedback portion comprises two groups of feedback circuits corresponding to one relay of the on-off control circuit.

8. The controller as claimed in claim 7, wherein each of the feedback circuits comprises a diode which rectifies a voltage from the on-off control circuit, a 20 resistor that drops the voltage, a Zener diode that regulates the voltage, a filter network, an opto-electrical coupling apparatus for electric isolation, and a plurality of capacitors that filters again.

9. The controller as claimed in claim 1, wherein said outside communication interface connects the controller to a console.

10. A controller for on-off switching of power supplies, comprising:
    a microprocessor;
    a power supply interface and reset circuit connected to the microprocessor;
    an on-off control circuit which is connected to the microprocessor, comprising a first transistor, a second transistor, a first relay, and a second relay, the first and second transistors forming a two-level amplifying circuit, the base of the second transistor connected to the microprocessor via a first resistor, the emitters of the first and second transistors connected to ground, the base of the first transistor and the collector of the second transistor connected to a first input of the first and second relays via a second resistor, the collector of the first transistor connected to a second input of the first and second relays, the first input of the first and second relays also connected to a voltage source, an output of the first relay connected to a first valve and a second valve, while an output of the second relay connected to a third valve and a fourth valve, one or more pieces of electrical equipment connected to an AC supply via the first and second relays;
    a feedback portion connected between the microprocessor and the first, second, third, and forth valves of the on-off control circuit, for feeding on-off states to the microprocessor;
    a memory connected to the microprocessor, for storing the data processed by the microprocessor; and
    an address selector connected to the microprocessor, for setting an address of said controller.

11. The controller as claimed in claim 10, wherein said address selector is a jumper.

12. The controller as claimed in claim 10, further comprises a crystal oscillator for providing a working frequency for the microprocessor.

13. The controller as claimed in claim 10, further comprising a communication interface connected to the microprocessor, for converting voltage signals between the microprocessor and an outside communication interface.

14. The controller as claimed in claim 13, wherein said outside communication interface connects the controller to a console.

15. The controller as claimed in claim 13, wherein said communication interface comprises a signal amplifying circuit, a communication chip, and a voltage regulation circuit connected in series.

16. The controller as claimed in claim 10, wherein said amplifying circuit comprises a plurality of transistors.

17. The controller as claimed in claim 10, wherein said feedback portion comprises two groups of feedback circuits corresponding to one relay of the on-off control circuit.

18. The controller as claimed in claim 17, wherein each of the feedback circuits comprises a diode which rectifies a voltage from the on-off control circuit, a resistor that drops the voltage, a Zener diode that regulates the voltage, a filter network, an opto-electrical coupling apparatus for electric isolation, and a plurality of capacitors that filters again.

* * * * *